Oct. 21, 1969 E. LUTZ 3,474,303

SEMICONDUCTOR ELEMENT HAVING SEPARATED CATHODE ZONES

Filed Sept. 7, 1966 3 Sheets-Sheet 1

INVENTOR
Edgar Lutz

BY Spencer & Kaye
ATTORNEYS

Oct. 21, 1969 E. LUTZ 3,474,303

SEMICONDUCTOR ELEMENT HAVING SEPARATED CATHODE ZONES

Filed Sept. 7, 1966 3 Sheets-Sheet 2

INVENTOR

Edgar Lutz

BY Spencer & Kaye

ATTORNEYS

INVENTOR
Edgar Lutz
BY Spencer & Kaye
ATTORNEYS

United States Patent Office 3,474,303
Patented Oct. 21, 1969

3,474,303
SEMICONDUCTOR ELEMENT HAVING SEPARATED CATHODE ZONES

Edgar Lutz, Pliezhausen, Germany, assignor to Semikron Gesellschaft fur Gleichrichlerbau und Elektronik m.b.H., Nuremberg, Germany Filed Sept. 7, 1966, Ser. No. 577,751
Claims priority, application Germany, Sept. 7, 1965, S 99,281, S 99,282
Int. Cl. H01l 3/00, 5/00
U.S. Cl. 317—234 17 Claims

ABSTRACT OF THE DISCLOSURE

A semiconductor element having separated cathode zones. The cathode zones are arranged in a preselected geometric pattern and are separated by intermediate zones. A self-supporting contact plate is arranged adjacent to the cathode so as to cover the entire cathode and contact the surfaces of the separated cathode zones. The contact plate is constructed with a geometric pattern similar to the cathode zones; that is, it has grooves corresponding to and aligned with the intermediate zones of the cathode.

The present invention relates generally to a semiconductor element and a method for making such element, and more particularly, to a semiconductor element for controlled semiconductors and a method for making such element.

The result of the rapid advances and developments in the field of semiconductor physics have produced more and more special technical uses for semiconductor elements. The users of the semiconductor elements always have greater requirements for the physical dimensions of the semiconductor elements so that the manufacturers and developers are always seeking to improve further the semiconductor elements.

There are opportunities for using controllable switching semiconductor elements such as silicon controlled rectifiers, for example. The elements can be used as switching elements made of three or more layers of alternating conductivities. The quicker the total cathode surface breaks down, the quicker will the current be distributed and avoid the danger of an overload at the time of breakdown of the semiconductor element. Since the current always flows from a limited breakdown region of the cathode surface, it is possible, by structurally limiting the ignition along an ignition channel to provide only a slight thermal overload during forward breakover voltage conditions. The channel absorbs the heat and effects damaging the semiconductor element.

A quick forward breakdown and with it a quick switching action and shortened switching time is necessary for the application of a controllable semiconductor element, for example, as a converter for high frequencies. The solutions proposed for increasing the initial firing zone in semiconductor elements with three or more layers having alternatingly conductivities have only resulted in partial solutions since, by their operation, they are very expensive and technological difficulties are encountered.

The increasing velocity of the front of the firing zone lies within known limits which are fixed by the manufacture of the semiconductor elements through the given physical properties of the components and can only be improved by expensive technological methods.

The separation of the control electrode into several different physical positions adjacent the cathode surface or through point-shaped construction permits the simultaneous firing to start the forward conduction in a plurality of different places. One of the proposed solutions, for example, has the control electrode arranged in the center. This poses many difficulties in the manufacture of the control electrode and of the required contacting of the control electrode from the outside. It is clear that the manufacturing techniques for such connection are very difficult.

Moreover, the known semiconductor elements for high power purposes such as, for example, high power rectifiers and high power thyristors depend on large active surfaces for their load capacities. These relatively large surfaces introduce contact problems which up until now, have not been satisfactorily resolved. Thus, the alloyed contact and the soldered contact to large surface rectifiers provide unusual mechanical stresses which may distort the semiconductor elements during the temperature processing for contacting purposes and often particularly for alternating loads and/or continuous loads using the maximum permissible current.

The pressurized contacts supply only a partial solution to the difficulties of the problem since they do not make good contact over a large active surface and their electrical and thermal contact resistance cannot be quite low. The apparatus in accordance with the principles of the present invention not only solves the problems for the manufacturer of high power semiconductor elements but, in addition, avoids all the problems of the known methods and results in an improvement in the technical demands for the increasing initial firing zone.

It is accordingly an object of the present invention to provide a new and improved semiconductor element.

A second object of the present invention is to provide a new and improved process for producing a semiconductor element.

A further object of the present invention is to provide a new and improved semiconductor element which shows an increasing initial firing zone.

An additional object of the present invention is to provide a new and improved semiconductor element which has a cathode divided into a plurality of separate cathode zones.

The invention includes a semiconductor constructional element wherein the cathode is divided into three or more segments of a desired geometric form, and a plate which is similarly segmented in the shape of the cathode is provided for contacting purposes and with grooves which, in their extent, correspond with the form of the separation zones between the cathode segments and which contact each other for covering purposes.

A further feature of the present invention includes a semiconductor element, particularly a controllable semiconductor element that is characterized by the cathode zone being separated into three or more partial zones and the control electrode being in strip shaped form and lying between the partial zones of the cathode and arranged at a preselected distance from the edges of the cathode partial zones.

Additional objects and advantages of the present invention will become apparent upon consideration of the following description when taken in conjunction with the accompanying drawings in which.

Figure 8:
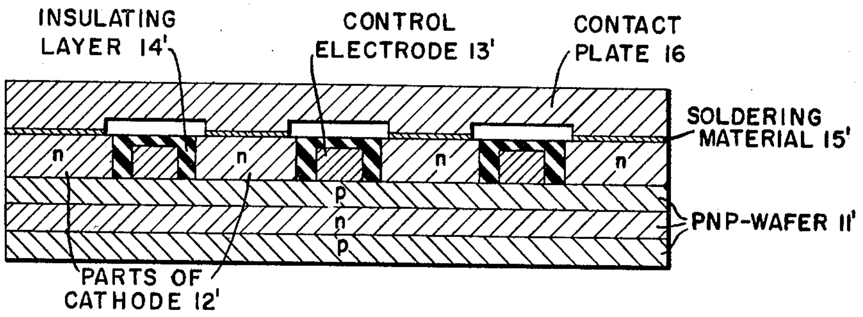
FIGURE 8 is a cross-sectional view of a semiconductor embodiment having a control electrode, a divided cathode and a contact plate with extended portions to contact, by means of soldering, the parts of cathode.
Figure 8A:
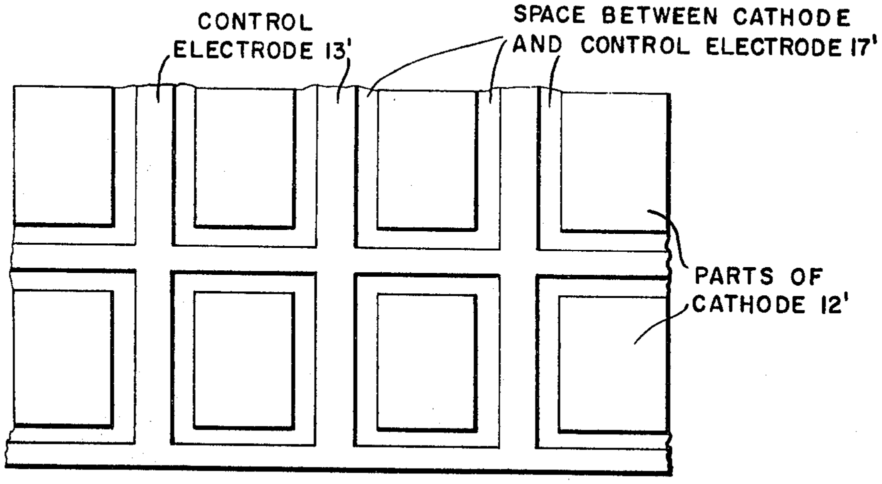

FIGURE 8*a* is a plan view of a segmented cathode layer arrangement with a control electrode between the parts of the cathode and with pre-selected spaces between control electrode and parts of cathode.

Figure 9A:
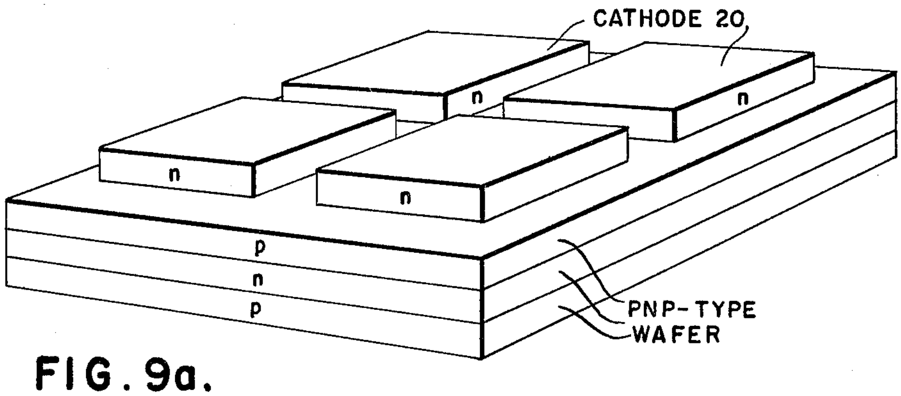
Figure 9B:
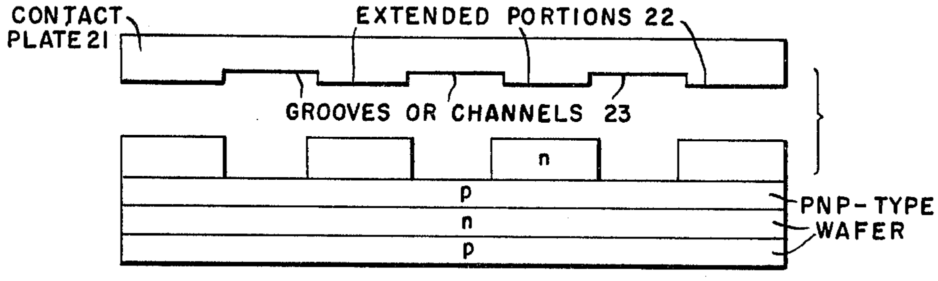

FIGURES 9*a* and 9*b* are respectively perspective and side elevational views of a rectangular divided cathode and a suitable contact plate.

Figure 10:
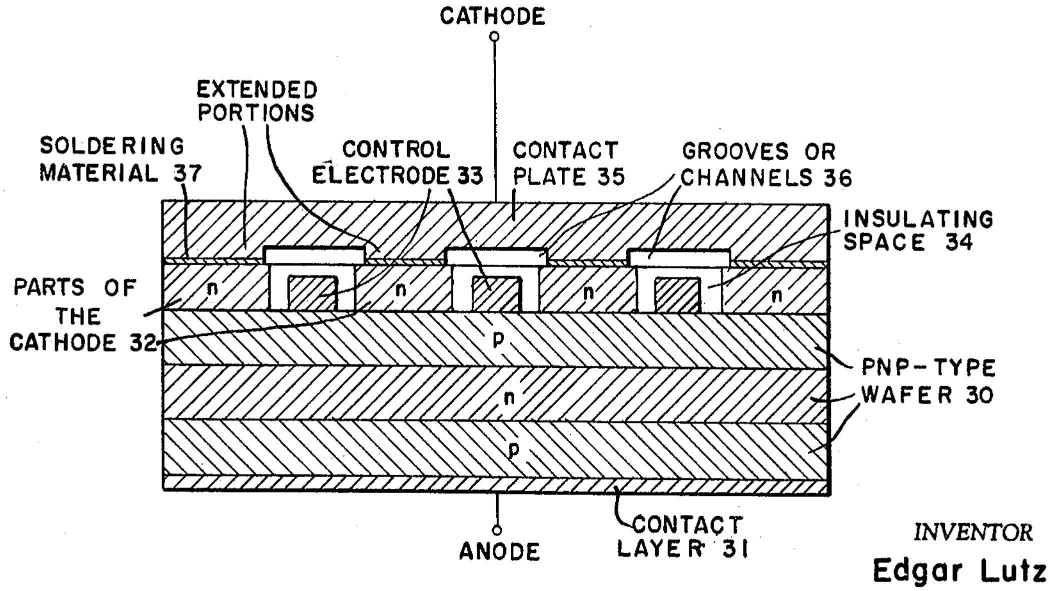

FIGURE 10 is a cross-sectional view of a complete semiconductor device constructed in accordance to the invention.

Figure 1:
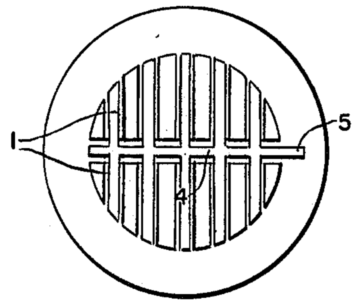
FIGURE 1 is a plan view of a segmented cathode layer having a control electrode and forming one embodiment of the present invention.

Referring to the drawings and more particularly to FIGURE 1, it can be seen that the cathode comprises separated cathode zones 1. Arranged between the separated cathode zones 1 is a control electrode 4 having a strip shaped configuration. Control electrode 4 has one of its ends 5 extending beyond the edges of the cathode zones. Such extended end 5 may be advantageously used as a connection terminal.

The edge portions of the control electrode 4 run parallel to the edge portions of the segmented cathode zones 1 and are maintained a desired distance therefrom.

Figure 3:
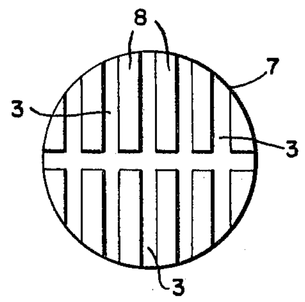
FIGURE 3 is a plan view of a contact plate constructed in accordance with the principles of the present invention.
Figure 4:
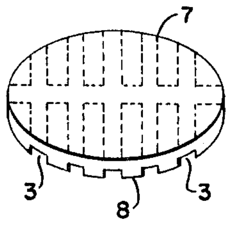
FIGURE 4 is a perspective view of the contact plate of FIGURE 3.

The advantages of the arrangement shown in FIGURE 1 can best be appreciated by the reference to FIGURES 3 and 4 wherein a plan view and a perspective view of a contact plate are respectively shown. The contact plate 7 is provided with grooves 3 and extended portions 8. At assembly, the extended portions 8 would be arranged over the cathode of FIGURE 1 so that the extended portions 8 contact the cathode zones 1. The grooves or channels 3 of the contact plate 7 would be arranged over the control electrode 4 while the extended portions 8 would be arranged above the separated cathodes 1.

Figure 7:
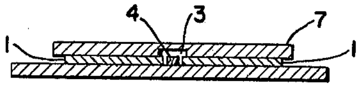
FIGURE 7 is a transverse cross-sectional view of a semiconductor having a control electrode therein.

This can best be seen in the cross-sectional view of FIGURE 7. Here the contact plate 7 is shown in contact with the divided zones 1 of the cathode. The cross-sectional view of the control electrode 4 is shown arranged below the groove or channel 3 in the center of member 7. The contact plate 7 thus serves to cover the divided cathodes 1 and the control electrode 4. Thus, during the subsequent temperature processing while contacts are being made between the contact plate and the separated cathode, undesired alloying or diffusion effects between the cathode parts can be avoided.

The separation of the cathode into parts in accordance with the principles of the present invention permits simple contact to the cathodes to be made by a wide contact plate such as that shown in FIGURE 7. This substantially simplifies the various difficulties in attempting to make a contact to large cathodes for semiconductor elements used for high power purposes.

The cross-sectional view of FIGURE 7 demonstrates that there is no ohmic contact between the control electrode 4 and the cathode 1. Similarly, the use of the grooves or channels in the contact plate 7 prevents any short circuit between the control electrode and the cathode by means of solder that is used for contact purposes. The mounting of the contact plates can be achieved by known contacting methods.

FIGURE 10 shows a complete semiconductor device constructed in accordance with the present invention. The silicon wafer 30 has a pnp structure and on one side of the p-type layer is the anode or anode contact layer 31. The divided cathode 32 is on the other side of the silicon wafer. The strips forming the control electrodes 33 are arranged between the separated parts of the cathode. An insulating space 34 is provided between the control strips and the parts of the cathode. The contact plate 35 having groove portions or channels 36 is connected with the parts of the cathode by soldering 37.

Figure 2:
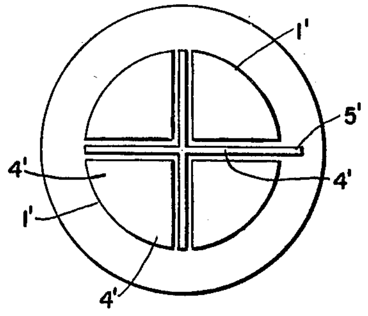
FIGURE 2 is a plan view of a second segmented cathode layer and control electrode in accordance with another embodiment of the present invention.

Referring to FIGURE 2, a different cathode arrangement is shown. In this arrangement, it can be seen that the cathode is split up into a plurality of circular segment members 1' having spaces therebetween. Disposed in the spaces is the grid-like structure 4' representing the control electrode for the arrangement of FIGURE 2. The control electrode 4' has an extended end portion 5' which extends beyond the edges of the divided cathodes 1' and may be used for connection purposes. In such an arrangement, the contact plate, equivalent to the contact plate 7, as shown in FIGURES 3 and 4 would be adapted to have extended portions contacting the divided cathodes 1' and grooved portions or channels which would cooperate with the control electrodes 4' so as to prevent contact between the cathode and the control electrode and provide the same benefits derived from the structure in FIGURE 7.

FIGURE 9*a* is a perspective view of a semiconductor arrangement wherein the divided parts of cathode 20 on the pnp-type wafer are rectangular in shape.

FIGURE 9*b* is a side view of the embodiment of FIGURE 9*a* but additionally shows the contact plate 21 having extended portions 22 and grooves or channels 23.

Figure 5:
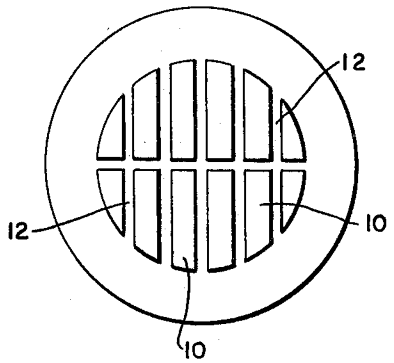
FIGURE 5 and FIGURE 6 are respectively plan and perspective views of a third segmented cathode layer arrangement.
Figure 6:
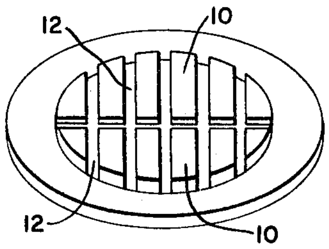

Similarly, in FIGURES 5 and 6, a plan and perspective view of a further embodiment of the present invention are illustrated. The cathode shown in FIGURES 5 and 6 is separated into a plurality of extended portions 10 which are separated by grooves or channels 12. It is clear that the extended portions 10 representing divided cathodes are electrically insulated from each other. However, they can be connected together by means of a properly shaped contact plate which would contact all of the extended portions 10 without making contact to the grooved portions 12. As in FIGURES 1 and 2, a control electrode (not illustrated) could be disposed along either the long central groove portion 12 or a grid-like control electrode such as 4' could be disposed in the grooves 12.

It should be appreciated that in all of the embodiments, the grooves of the contact plates would be wider than the strips of the control electrode so that there would be no contact between the control electrode and a contact plate such as that shown in FIGURE 3 or 4.

The advantageous arrangement of the separated cathode zones and the strip shaped control electrode zones which may use a single control electrode such as that shown in FIGURE 1 or a grid-shaped control electrode such as that illustrated in FIGURE 2, provides a plurality of several initial firing zones. It is desired that the increasing of the firing zone occurs over the total cathode surface very quickly since for each point of the leading edge of the voltage breakover waveshape, there is an equal, fixed increasing velocity for all initial firing zones.

The strip shaped construction of the control electrode in the intermediate zones between the divided cathode surfaces not only provides in a relatively simple manner, a relatively large leading edge of the firing zone. It also makes possible, in the construction of the semiconductor element, the provision of one or more contact terminals which extend beyond the cathode edge to permit contact to be made to the control electrode in a simplified advantageous manner.

The cathode zones, as have been illustrated above, can be made in three or more equal or unequal circular segments, rectangular segments or in any desired form so that they are separated into divided cathode zones and are provided with corresponding intermediate spaces or grooves. The control electrode strips which run parallel to the edges of the divided zones of the cathode can be electrically connected in parallel or can be separately connected.

For the advantageous enlargement of the front or leading edge of the firing zone, the control electrode strips can be so arranged that the segmented cathode zones or one or more of the divided zones themselves can fully or partially be surrounded by the control electrode strips.

The semiconductor elements made in the form incorporating the principles of the present invention may be arranged in three or more layers of alternating and different conductivities. Each of the layers would have the divided cathode zones and can be produced with known alloying techniques.

Also, a semiconductor element incorporating the principles of the present invention can be made wherein the cathode is alloyed, while the control electrode in the intermediate regions of the divided zones of the cathode would be produced by using known masking techniques. Moreover, the masking techniques can be used for producing the single cathode divided zones. The control electrode strips can be made by diffusion methods. The divided zones of the cathode can also be epitaxially grown.

The method for producing the semiconductor element in accordance with the principles of the present invention has particular advantages for semiconductor manufacturing techniques and has good characteristics in general, particularly for power purposes.

The resulting semiconductor elements which have been constructed with the cathode separated into divided zones in accordance with the principles of the present invention show, in each case, particularly good switching ratios. Not only is the manufacture of such semiconductor elements simpler than the previously known elements but they also provide higher switching velocities.

The semiconductor element in accordance with the principles of the present invention and the corresponding shorter paths for the increasing firing zone has effected a larger leading edge or the front of the firing zone produce an improvement in the *di/dt* ratio. Thus, a decrease in switching on time is achieved. At the same time the geometrically advantageous arrangement of the cathode zones and the corresponding control electrode strips permit the control electrode to quickly sweep out the charge carriers which is necessary for trouble-free cut-off of the semiconductor.

The semiconductor element constructed in accordance with the principles of the present invention provides particular advantages when used in a semiconductor for switching purposes. Furthermore, the semiconductor element can be so arranged that the control electrode strips separately extend outwardly and are used as connections for alternately switching the semiconductor on and off.

A further advantageous possibility exists for the semiconductor element if the control electrode strips and also the cathode divided zones are separately connected and outwardly extended so that a multiple element is provided that, can be used for switching parallel current circuits.

For use in high power semiconductor elements, in order to provide the greatest protection and to avoid short circuits between the cathode segments and the control electrode, an insulating layer can be provided between the cathode segments and on the edges of the cathode zones with or without control electrodes therein. For example, a layer of plastic or synthetic resin can be used for protective purposes or a lacquered layer or an oxide layer can be provided.

FIGURE 8 is a cross-sectional view of a pnp-type wafer 11'. The cathode 12' is of n-type conductivity and is divided into a plurality of parts. The spaces between the parts of the cathode are sufficient to allow positioning therein of control electrode strips 13'. There is a spacing between the edges of the parts of the cathode and the control electrode strips and this is an insulation space or, it can be filled with an insulating layer 14'. A contact plate is connected along its extended portions only on the parts of the cathode and a soldering material 15' is used and is limited to only the conducting parts of the uppermost layer. FIGURE 8*a* shows the configuration of a rectangular divided cathode with control electrode strips 13' within the space 17' between each part of the cathode, and the space between the control electrode strips and the parts of the cathode may be filled with an insulating material.

Arrangements of this type having large active cathodes are advantageously provided for silicon controlled rectifier elements to be used for high power purposes and particularly for live or alternating loads. They can also be used as switchable semiconductor elements since by means of the segmented cathode arrangement an enlargement of the leading edge of the initial firing zone is provided and with it the optimizing of the recombination effect and the desired reverse flow of charge carriers.

It will be understood that the above description of the present invention is susceptible to various modifications, changes, and adaptations, and the same are intended to be comprehended within the meaning and range of equivalents of the appended claims.

What is claimed is:

1. In a semiconductor rectifier element, the combination comprising:

(a) a cathode having at least three separated cathode zones arranged in a preselected geometric pattern and separated by a plurality of intermediate zones; and (b) a self-supporting contact plate adjacent said cathode and having a similar geometric pattern to said cathode zones and having grooves corresponding to said intermediate zones of said cathode so that said contact plate contacts said separated cathode zones and said grooves of said contact plate are aligned with said intermediate zones of said cathode, thereby contacting and covering said cathode.

2. The combination defined in claim 1 wherein said element is made from silicon.

3. The combination defined in claim 1 wherein a strip shaped control electrode is arranged in at least one of said intermediate zones of said cathode, a pre-selected distance from the edges of said cathode zones.

4. The combination defined in claim 1 wherein an insulating layer is arranged in said intermediate zones of said cathode.

5. The combination defined in claim 1 wherein a strip shaped control electrode is arranged in at least one of said intermediate zones of said cathode and is separated from said cathode by an insulating layer.

6. The combination defined in claim 5 wherein said insulating layer is made from a plastic or a synthetic resin.

7. The combination defined in claim 5 wherein said insulating layer is an oxide layer.

8. The combination defined in claim 3 wherein said strip shaped control electrode has at least one end which extends beyond the edge of the cathode and serves as a connecting terminal.

9. The combination defined in claim 1 wherein said cathode zones are separated into at least three circular segments.

10. The combination defined in claim 1 wherein said cathode zones are separated into at least three rectangular zones.

11. The combination defined in claim 3 wherein the edge portions of said control electrode strips are parallel to the corresponding edge portions of said cathode zones.

12. The combination defined in claim 3 wherein the strips of said control electrode are arranged electrically in parallel with each other.

13. The combination defined in claim 3 wherein the strips of said control electrode are electrically insulated from each other.

14. The combination defined in claim 3 wherein the strips of said control electrode at least partially surround at least one of said cathode zones.

15. In a silicon controlled rectifier, the combination comprising:

(a) a cathode having at least three separated cathode zones arranged in a preselected geometrical pattern and separated by a plurality of intermediate zones;

(b) a strip shaped control electrode arranged in at least two of said intermediate zones of said cathode and at a preselected distance from the edges of said cathode zones so that said control electrode will serve to sweep out the charge carriers during operation of the rectifier; and (c) a contact plate having a similar geometric pattern to said cathode zones and having grooves corresponding to said intermediate zones of said cathode, whereby when said contact plate is arranged adjacent said cathode, said contact plate being adjacent said cathode and contacting said separated cathode zones and said grooves of said contact plate being aligned with said intermediate zones of said cathode, thereby contacting and covering said cathode and covering said control electrode.

16. In a silicon controlled rectifier in accordance with claim 15 wherein the individual control electrode strips are separated from each other and serve alternately for turning the rectifier on and off.

17. In a silicon controlled rectifier in accordance with claim 15 wherein the control electrode strips are separated from one another as are the cathode zones said strips and said zones being connected to separate connections externally of the semi-conductor element.

References Cited

UNITED STATES PATENTS

| | | | |
|---|---|---|---|
| 3,355,636 | 11/1967 | Becke et al. | 317—235 |
| 3,381,183 | 4/1968 | Turner et al. | 317—234 |
| 2,831,787 | 4/1958 | Emeis. | |
| 2,837,704 | 6/1958 | Emeis. | |
| 3,160,800 | 12/1964 | Smart. | |
| 3,210,621 | 10/1966 | Strull. | |
| 3,213,339 | 10/1965 | Henkels. | |
| 3,309,585 | 3/1967 | Forrest. | |
| 3,356,862 | 12/1967 | Diebold et al. | 317—235 X |

FOREIGN PATENTS

| | | |
|---|---|---|
| 954,534 | 4/1964 | Great Britain. |

JOHN W. HUCKERT, Primary Examiner

R. F. POLISSACK, Assistant Examiner

U.S. Cl. X.R.

317—235

PO-1050
(5/69)

UNITED STATES PATENT OFFICE
CERTIFICATE OF CORRECTION

Patent No. 3,474,303 Dated October 22nd, 1969

Inventor(s) LUTZ, EDGAR

It is certified that error appears in the above-identified patent and that said Letters Patent are hereby corrected as shown below:

Column 1, line 5, change "Gleichrichlerbau" to --Gleichrichterbau--. Column 4, lines 5 and 6, change "segment members" to --segments--.

SIGNED AND SEALED NOV 17 1970

(SEAL)
Attest:

Edward M. Fletcher, Jr.
Attesting Officer

WILLIAM E. SCHUYLER, JR.
Commissioner of Patents